United States Patent Office 2,993,836
Patented July 25, 1961

2,993,836
SUSTAINED RELEASE TABLETS
Harold A. Nash, Zionsville, and Sampson F. Jeffries, Indianapolis, Ind., assignors, by mesne assignments, to The Dow Chemical Company, Midland, Mich., a corporation of Delaware
No Drawing. Filed Feb. 20, 1958, Ser. No. 716,282
4 Claims. (Cl. 167—82)

This invention relates to improvements in pharmaceutical tablets. More particularly, it relates to a method of preparing a sustained release tablet which breaks down uniformly in an aqueous medium independent of pH and/or the presence of enzymes. Our invention also relates to improved sustained release tablets made by such method.

In accordance with the present invention, we have found that a medicinal tablet can be prepared by using as the essential carrier a mixture containing about 50% of equal quantities of glyceryl monostearate and gum karaya, and 50% of a water insoluble material such as calcium sulfate, talc, or the like, and mixtures thereof. A tablet granulation prepared from the ingredients described above may have incorporated therein up to about 15% of a desired therapeutic agent and tablets may be prepared using ordinary tableting techniques. The tablets thus produced, when exposed to an aqueous medium, slowly release the medicinal agent therefrom at a uniform rate. The slow regular release rate and/or disintegration of the tablet is independent of the pH of said aqueous medium and of the presence of substances such as bile, and enzymes such as pepsin and pancreatin. Thus, when administered to a patient, the uniform release of the medicament from the tablet makes it available for absorption at a uniform rate regardless of the part of the gastrointestinal tract in which the tablet lies.

The time period over which our improved tablets disintegrate can be regulated by varying the ingredients and by varying tablet thickness. In most instances we prefer that our tablets possess a breakdown which is nearly a straight line function over a period of about seven hours. Even slower breakdown is possible by varying the ingredients and thickness of the tablet. On the other hand, we can provide a tablet which will break down at a regular rate in as short a period as an hour. In a preferred form of our invention, a basic tablet or tablet core is prepared from a tablet granulation which is made up of at least about 50% of glyceryl monostearate and gum karaya in approximately equal parts, and about 50% of a water insoluble substance such as calcium sulfate or of equal mixtures of calcium sulfate and talc, and which granulation has incorporated therein up to about 15% of a selected medicinal agent or combination of medicinal agents and compressed into a tablet of a suitable size and hardness. The suitable size and hardness of the tablet can be determined experimentally in order to provide a tablet or core having a disintegration rate and release of the therapeutic agent over the pre-selected time period. In order to provide the patient with an immediate quantity of the desired medicinal agent, the basic tablet or core may be coated with a tablet coating which contains additional quantities of the desired therapeutic agent, and which coating readily disintegrates to provide an immediate dose of said therapeutic agent. The following specific examples will serve to illustrate our invention:

EXAMPLE I

The following will serve as an example for making a batch of 42,000 tablets using a wet granulation technique: 3890 grams of Glyceryl Monostearate (Aldo 72) and a like amount of Gum Karaya N.F., and of Calcium Sulfate Purif., are mixed with 2723 grams of Talc U.S.P. The whole is made into a moistened mass with a paste of 430 grams of Tragacanth with Purified Water U.S.P. This mass is dried, sieved, and to it is then added 112 grams of Chlorpheniramine Maleate, 560 grams of Phenylephrine Hydrochloride U.S.P., 1140 grams of Talc U.S.P. and 162 grams of Magnesium Stearate U.S.P., and the completed granulation compressed into tablets, each weighing 400 mg., on ⅜" die. Subcoating is applied to these tablets in a standard coating pan, after which 308 grams of Phenylephrine Hydrochloride and 61.6 grams of Chlorpheniramine Maleate are applied dissolved in syrup. Tablets are then finished off in the conventional manner.

EXAMPLE II

Preparation of tablets using dry granulation technique: 3890 grams of Glyceryl Monostearate (Aldo 72) and a like amount of Gum Karaya N.F., and of Calcium Sulfate Purif. are mixed with 2723 grams of Talc U.S.P. To this mixture are added 168 grams of Chlorpheniramine Maleate and 840 grams of Phenylephrine Hydrochloride U.S.P. 1067 grams of Talc U.S.P. and 120 grams of Magnesium Stearate U.S.P. are admixed and the entire slugged. After sieving, 168 grams of Talc U.S.P. and 42 grams of Magnesium Stearate U.S.P. are added and the product compressed into tablets, each weighing 400 mg., on ⅜" die.

EXAMPLE III 3890 grams of Glyceryl Monostearate (Aldo 72) and a like amount of Gum Karaya N.F. and of Calcium Sulfate Purif. are mixed with 1631 grams of Talc U.S.P. To this mixture are added 2100 grams of Priscoline Hydrochloride, 1067 grams of Talc U.S.P., 120 grams of Magnesium Stearate U.S.P., and after mixing, the entire is slugged. After sieving, 168 grams of Talc U.S.P., and 42 grams of Magnesium Stearate U.S.P. are added and the product compressed into tablets, each weighing 400 mg., on ⅜" die.

EXAMPLE IV 3890 grams of Glyceryl Monostearate (Aldo 72) and a like amount of Gum Karaya N.F. and of Calcium Sulfate Purif. are mixed with 1841 grams of Talc U.S.P. To this mixture are added 1050 grams of Pheniramine Maleate and 840 grams of Phenylephrine Hydrochloride. 1067 grams of Talc U.S.P. and 120 grams of Magnesium Stearate U.S.P. are admixed and the entire slugged. After sieving, 168 grams of Talc U.S.P. and 42 grams of Magnesium Stearate are added and the product compressed into tablets, each weighing 400 mg., on ⅜" die.

It is seen in the foregoing examples that the essential ingredients responsible for the continuous slow and essential uniform release of medicinal agents admixed therewith comprise glyceryl monostearate, gum karaya, and an essentially water-insoluble, solid, non-toxic, particulate, granular agent such as calcium sulfate. It is obvious that other medicinal agents to serve as the active therapeutic component of our tablets may comprise any medicament which, when present up to an amount approximating 15% of the carrier combination, may be used to replace those specific active therapeutic agents employed in the examples. The particular antihistamine employed in our examples may be replaced by other antihistaminic substances, such as, for example: pyrilamine maleate and prophenpyridamine - p - amino-salicylate. Therapeutic agents having a central nervous system stimulant or appetite depressant action may be used in our tablets; such as, for example: dextro-amphetamine sulfate, d-desoxyephedrine hydrochloride, and the like; central nervous system depressants of the barbiturate type, such as, for example: phenobarbital, barbital, pentobarbital, amobarbital, and the like. Other suitable medicinal substances include phenylpropanolamine hydrochloride, dihydrocodeinone bitartrate, triethanolamine trinitrate biphosphate and pentaerythrital tetranitrate.

In the foregoing examples the water-insoluble granular material employed consisted of calcium sulfate and/or combinations of calcium sulfate and talc, either calcium sulfate or talc may be used alone or in combination with the other. Likewise, either may be replaced with other suitably non-toxic, relatively water-insoluble crystalline materials; such as, for example: dibasic calcium phosphate. It is considered essential, however, that this water-insoluble crystalline material or combination of such materials be present in an amount that is approximately equal to the combined amounts of glyceryl monostearate and gum karaya. Preferably, the glyceryl monostearate and gum karaya are used in approximately equal quantities. These quantities can be varied somewhat, however, and satisfactory results still be obtained.

Various auxiliary substances have been employed in the tableting formulations for the purpose of facilitating the preparation of tablets. These various tableting aids, however, are not essential from the standpoint of imparting the property of slowly releasing the medicinal agent from the tablets. When a dry granulation tableting technique is employed, certain auxiliary tableting aids may be required, and when a wet granulation technique is employed other tableting aids may be employed. It is contemplated, therefore, that these additional tableting aids may be used in accordance with the art. Likewise, in certain instances it is desired that our tablets contain a coating. These coatings may be applied by the technique described in Example I, or if desired, a coating containing additional quantities of a therapeutic agent such as phenylephrine hydrochloride of chlorpheniramine maleate may be applied by use of a compression coating machine. The coating on the tablet itself is merely applied for the purpose of pharmaceutical elegance or for the purpose of supplying an initial immediate release of an active drug, but the coating does not have any substantial effect on the sustained release of the medicinal agent from the main body or core of the tablet.

In order to measure the sustained release of therapeutic agents from our tablets, in vivo studies were carried out in humans. The method employed involved the incorporation of a marker substance in our tablet formulations, which marker is quickly absorbed from the gastrointestinal tract and quickly excreted in the urine. Thus, the excretion reflects the rate at which the substance becomes available from the tablet formulations for absorption. Priscoline-Hydrochloride (2 - benzyl-2-imidazoline hydrochloride) was selected as the marker substance since it has these properties of being rapidly absorbed and rapidly excreted via the urine. Additionally, it is capable of determination with sufficient sensitivity and accuracy in urine to permit the study of the performance of individual tablets. The technique and results obtained are as follows:

EXPERIMENTAL

*Dosage.*—Subjects took orally either 25 mg. of Priscoline-Hydrochloride (2 - benzyl - 2-imidazoline hydrochloride') in 50 ml. of water or tablets prepared as described in the foregoing examples and containing 25 or 50 mg. of Priscoline-Hydrochloride. The subjects were instructed to void the bladder just before dosage and to collect hourly samples of urine. Subjects continued on their usual diet. At least 48 hours were allowed to lapse between doses.

*Analysis of samples.*—Priscoline was determined by the method of Brodie, Aronow, and Axelrod (J. Pharm. Exptl. Therapeutics, 106–200 (1950)). Blanks representing excretion of substances behaving like Priscoline in the assay were studied for each individual and found to be remarkably constant. The average blank contribution for each individual was applied to apparent excretion rates.

*In vitro disintegration studies.*—The behavior of tablets in vitro was studied by two techniques. One technique closely copies the U.S.P. method but with the apparatus speeded to 41 strokes of 11 cm. each per minute. This modification was made to subject the tablets to greater mechanical abrasion than is done by the standard U.S.P. method. The greater mechanical abrasion was designed to cause the tablets to break apart nearly as rapidly as they became wetted. Simulated gastric and intestinal juices (U.S.P. XV) were used as media in these studies. Samples of these solutions were taken at hourly intervals and assayed for Priscoline by the same technique used for Priscoline assay in urine.

The second technique involved a minimum of mechanical agitation and made use of a procedure in which the tablets were placed between loose layers of glass wool in a glass tube of 1.8 cm. diameter and 15 cm. long. Liquid from a 100 ml. reservoir was then circulated past the tablets at a rate of 20–30 ml. per minute. The test was started with 100 ml. of simulated gastric juice and at hourly intervals 50 ml. aliquots were withdrawn and replaced with 50 ml. portions of simulated intestinal juice. The aliquots withdrawn were assayed for Priscoline by the same techniques used for Priscoline assay in urine.

The results from which tablet breakdown times in vivo are deduced are shown in Table I. This table shows milligrams of Priscoline-Hydrochloride excreted per hour from each of four subjects following 25 mg. doses in solution or 50 mg. doses given in our sustained release tablets. Two experiments of each type were done on each individual.

TABLE I

*Excretion of Priscoline-HCl in human beings*

| Hrs. | Mg. Priscoline HCl excreted per hour | | | | | | | |
|---|---|---|---|---|---|---|---|---|
| | Subject HAN | | Subject VS | | Subject AK | | Subject CB | |
| | Soln.[a] | Tab.[b] | Soln.[a] | Tab.[b] | Soln.[a] | Tab.[b] | Soln.[a] | Tab.[b] |
| 1 | 3.7 | 5.0 | 1.5 | 0.4 | 5.9 | 1.6 | 2.3 | 2.1 | 2.2 | 2.9 | 3.5 | 0.8 | 2.3 | 1.3 | 0.1 | 0.5 |
| 2 | 4.5 | 5.3 | 2.1 | 3.5 | 5.7 | 5.2 | 6.5 | 5.4 | 4.7 | 6.2 | 5.2 | 5.4 | 3.7 | 3.6 | 2.0 | 3.4 |
| 3 | 3.3 | 4.6 | 7.5 | 7.0 | 3.5 | 4.0 | 7.6 | 5.6 | 3.9 | 3.7 | 2.8 | 4.4 | 2.7 | 2.9 | 3.5 | 4.4 |
| 4 | 2.7 | | 4.8 | 5.5 | 1.9 | 3.6 | 5.5 | 5.5 | 2.7 | 2.9 | 3.9 | 6.0 | 2.2 | 1.7 | 4.5 | 3.9 |
| 5 | 1.7 | [c]1.9 | 4.8 | 3.8 | 1.2 | 1.9 | 4.7 | 5.2 | 2.1 | 2.2 | 4.2 | 5.0 | 2.0 | 2.6 | 4.0 | 4.5 |
| 6 | 1.4 | 1.3 | 4.4 | 3.4 | 1.1 | 1.5 | 4.0 | 4.2 | 0.9 | 1.6 | 4.2 | 3.6 | 1.7 | 1.8 | 3.5 | 3.2 |
| 7 | 0.9 | | 3.5 | 2.6 | 1.1 | 1.1 | 3.1 | 2.7 | 1.3 | 1.2 | 3.4 | 3.7 | 1.4 | 1.5 | 3.7 | 3.1 |
| 8 | 0.7 | [c]0.8 | 3.1 | | | | 1.0 | 2.6 | 2.4 | | | 3.2 | 2.9 | 1.0 | 0.9 | 2.9 | 2.7 |
| 9 | | | 0.7 | 2.1 | [c]1.9 | | | 0.7 | 2.0 | 2.4 | | | 2.2 | 2.7 | | | 2.2 | |
| 10 | | | | | 1.5 | | | | 2.3 | 1.6 | | | 2.1 | 2.2 | | | 2.1 | |
| 11 | | | | 1.5 | | | | | 2.0 | 1.3 | | | 1.1 | 1.0 | | | 1.4 | |
| 12 | | | | 1.4 | [c]1.1 | | | | 1.8 | 0.9 | | | 1.6 | | | | 0.9 | [c]0.9 |

[a] Collections following 25 mg. of Priscoline-Hydrochloride taken orally in 50 ml. of water.
[b] Collections following 50 mg. of Priscoline-Hydrochloride compounded in a sustained release tablet.
[c] Represents a urine sample including all urine since last time for which an entry has been made.

The excretion rates when Priscoline-Hydrochloride is given in solution are seen to approach a maximum after one to two hours and then regress as a logarithmic function. When the Priscoline-Hydrochloride is given in our sustained release tablets, the excretion follows a different pattern, the peak rate of excretion being achieved more slowly and being maintained for some hours before beginning to drop off rapidly. In the case of the sustained release tablet Priscoline absorption continues to replenish body stores of Priscoline as it is made available from the tablet. When the tablet has substantially broken down, then absorption plays a small part and the excretion rates approach those seen when Priscoline is administered in solution. The breakdown time of the tablets used in the present study is estimated to range from 3 to 6 hours. This is arrived at by subtracting one and a half hours from the total time required for the excretion to reach the point where it begins to decrease as a logarithmic function. The one and a half hours is the time required for the logarithmic excretion phase to begin even when absorption is maximal, as it must be when Priscoline is administered in solution. Subject HAN has yielded results difficult of analysis in that there is a plateau of relatively short duration but the excretion rate never becomes as great as when the solutions had been given.

Total recoveries of administered Priscoline-Hydrochloride are pertinent to the evaluation of the excretion results as an indication of tablet breakdown. These recoveries are given in Table II.

TABLE II

| Subject | Percent Recovery | |
|---|---|---|
| | Solution | Tablet |
| HAN | 94 / 91 | 67 / 81 |
| VS | 82 / 83 | 78 / 91 |
| AK | 85 / 77 | 79 / 80 |
| CB | 69 / 65 | 64 / 69 |

Collections were not carried to the point at which Priscoline excretion became negligible but the recovery results are roughly comparable on the basis that collections were continued to approximately the same points on a logarithmic regression curve.

Essentially the same results were obtained using triethylamine hydrochloride as a tracer or using 25 mg. instead of 50 mg. of Priscoline-HCl in tablets. Triethylamine was found to be excreted less rapidly than Priscoline and so was a less sensitive marker. The 50 mg. quantities of Priscoline in tablets were used to lessen the importance of the blank contribution. Results with tablets containing 25 mg. quantities were, however, gratifying in showing the answers not to be an artifact of the amount of Priscoline given.

For comparison of in vivo results and in vitro results the release of Priscoline from the tablets in vitro is shown in Tables III, IV, and V.

TABLE III

*In vitro disintegration of tablets containing ⅓ of dose in coating as indicated by release of Priscoline into solution in modified USP XV apparatus*

| Hour | Percent in Solution (coated tablets) | | | |
|---|---|---|---|---|
| | USP XV Gastric, pH 1.2 | | USP XV Intestinal, pH 7.5 | |
| 1 | 57 | 55 | 62 | 65 |
| 2 | 75 | 69 | 78 | 76 |
| 3 | 83 | 79 | 86 | 86 |
| 4 | 90 | 86 | 96 | 93 |
| 5 | 96 | 86 | 100 | 98 |
| 6 | 100 | 99 | | 100 |

TABLE IV

*In vitro disintegration of tablets as indicated by release of Priscoline-HCl in modified USP XV disintegration apparatus*

| Hour | Percent of Priscoline-HCl in soln. (non-coated tablets) | | | |
|---|---|---|---|---|
| | USP XV Simulated Gastric Juice | | USP XV Simulated Intestinal Juice | |
| 1 | 49.4 | 48.2 | 49.6 | 46.8 |
| 2 | 71.2 | 63.7 | 67.4 | 63.7 |
| 3 | 87.0 | 89.0 | 80.6 | 82.0 |
| 4 | 96.0 | 97.0 | 87.6 | 96.4 |
| 5 | 100.0 | 100.0 | 99.0 | 100.0 |

TABLE V

*In vitro disintegration of tablets as indicated by release of Priscoline-HCl in apparatus involving no agitation*

| Hour | Percent of Priscoline in solution (non-coated tablets) |
|---|---|
| 1 | 41.6 |
| 2 | 61.4 |
| 3 | 68.5 |
| 4 | 76.5 |
| 5 | 82.3 |
| 6 | 86.7 |
| 7 | 89.5 |
| 8 | 92. |

In Table III results are shown for simulated gastric and intestinal media in a disintegration machine which subjected the tablets to a moderate degree of mechanical abrasion, and in Table V results are shown for a disintegration procedure which subjected tablets to a minimum of mechanical abrasion. As might be expected, the results are initially fairly parallel and become more divergent as diffusion rate plays a larger part in the apparatus in which the tablets do not disintegrate.

We claim:

1. A pharmaceutical preparation comprising a compressed tablet containing as the essential carrier ingredients approximately equal parts of glyceryl monostearate and gum karaya and an amount of a solid, non-toxic, particulate, essentially water insoluble material in an amount equal to that of the combined quantities of glyceryl monostearate and gum karaya, said carrier combination having incorporated therein up to about 15% by weight thereof of substances selected from the group consisting of a selected therapeutic agent and combinations of selected therapeutic agents, said tablet being slowly disintegratable at a uniform rate in an aqueous medium independent of the pH of said medium.

2. A pharmaceutical preparation comprising a compressed tablet including a carrier comprising approximately 50% of a mixture of about equal parts of glyceryl monostearate and gum karaya and approximately 50% of a solid, non-toxic, particulate, essentially water insoluble material, said carrier containing intimately mixed therewith up to about 15% by weight thereof of substances selected from the group consisting of a selected therapeutic agent and combinations of selected therapeutic agents and which tablet possesses a uniform prolonged disintegration rate when subjected to treatment with an aqueous medium independent of the pH of said medium.

3. A pharmaceutical preparation comprising a compressed tablet including a carrier comprising approximately 50% of a mixture of about equal parts of glyceryl monostearate and gum karaya and approximately 50% of a solid, non-toxic, particulate, essentially water insoluble material selected from the group consisting of calcium sulfate and talc, said carrier containing intimately mixed therewith up to about 15% by weight thereof of substances selected from the group consisting of a selected therapeutic agent and combinations of selected therapeutic agents and which tablet possesses a uniform prolonged disintegration rate when subjected to treatment with an aqueous medium independent of the pH of said medium.

4. A pharmaceutical tablet in accordance with claim 3 characterized in that the therapeutic agents are chlorpheniramine maleate and phenylephrine hydrochloride.

References Cited in the file of this patent
UNITED STATES PATENTS
2,793,979   Svedres _____ May 28, 1957

OTHER REFERENCES

Merck Index, 6th edition, Merck and Co., Rahway, N.J., 1952, pages 191, 553 and 930.